(12) United States Patent
Gaddam et al.

(10) Patent No.: US 12,461,664 B2
(45) Date of Patent: Nov. 4, 2025

(54) PROTECTED DATA RESTORATION USING CONFIDENTIAL COMPUTING

(71) Applicant: Cohesity, Inc., San Jose, CA (US)

(72) Inventors: Sivanarayana Gaddam, Santa Clara, CA (US); Gyan Prakash, Foster City, CA (US); Suchit Kaura, San Ramon, CA (US)

(73) Assignee: Cohesity, Inc., Santa Clara, CA (US)

( * ) Notice: Subject to any disclaimer, the term of this patent is extended or adjusted under 35 U.S.C. 154(b) by 0 days.

(21) Appl. No.: 18/618,938

(22) Filed: Mar. 27, 2024

(65) Prior Publication Data
US 2025/0306776 A1    Oct. 2, 2025

(51) Int. Cl.
*G06F 3/06* (2006.01)

(52) U.S. Cl.
CPC ............ *G06F 3/0622* (2013.01); *G06F 3/065* (2013.01); *G06F 3/067* (2013.01)

(58) Field of Classification Search
None
See application file for complete search history.

(56) References Cited

U.S. PATENT DOCUMENTS

| | | | | |
|---|---|---|---|---|
| 2012/0027214 | A1* | 2/2012 | Yokota | H04L 9/0897 380/286 |
| 2021/0271763 | A1* | 9/2021 | Perlman | G06F 21/602 |
| 2022/0207155 | A1* | 6/2022 | Chhabra | G06F 21/602 |
| 2022/0382686 | A1* | 12/2022 | Van Riel | G06F 3/0641 |

FOREIGN PATENT DOCUMENTS

WO    2023158695 A1    8/2023

OTHER PUBLICATIONS

Cohesity et al., "Cohesity FortKnox", Cohesity, Inc., 2024, 3 pp., Retrieved from the Internet on Jun. 28, 2024 from URL: https://www.cohesity.com/resource-assets/datasheets/cohesity-fortknox-data-sheet-en.pdf.
Stripe, "Chargeback fraud 101: What businesses need to know", Stripe, Inc., May 30, 2023, 11 pp., URL: https://stripe.com/resources/more/chargeback-fraud-101#:~:text=Chargeback%20fraud%20is%20a%20growing,estimated%20%2420%20billion%20in%202021.

(Continued)

*Primary Examiner* — Edward J Dudek, Jr.
*Assistant Examiner* — Ralph A Verderamo, III
(74) *Attorney, Agent, or Firm* — Shumaker & Sieffert, P.A.

(57) ABSTRACT

Techniques are described for protected data restoration using confidential computing. An example method comprises receiving, by a data platform implemented by a computing system, a request to restore an encrypted chunk of data, the encrypted chunk stored with first encrypted key data and second encrypted key data, receiving, by an enclave implemented in a trusted execution environment, first encrypted key data and second encrypted key data from the storage cluster, decrypting, by the enclave, the first encrypted key data to obtain the first key data and the second encrypted key data to obtain the second key data, generating, by the storage cluster, a derived data encryption key corresponding to the data encryption key based on the first key data and the second key data, and decrypting, by the storage cluster, the encrypted chunk with the derived data encryption key to generate a decrypted chunk.

20 Claims, 7 Drawing Sheets

(56) References Cited

OTHER PUBLICATIONS

Verizon, "2023 Data Breach Investigations Report", Verizon, Jun. 6, 2023, 89 pp., URL: https://inquest.net/wp-content/uploads/2023-data-breach-investigations-report-dbir.pdf.
Extended Search Report from counterpart European Application No. 24181361.7 dated Dec. 6, 2024, 6 pp.
Ren et al., "Accelerating Encrypted Deduplication via SGX", 2021 USENIX Annual Technical Conference (USENIX ATC 21), Jul. 14, 2021, 15 pp.
Silva et al., "Deduplication vs Privacy Tradeoffs in Cloud Storage", Proceedings of the 38th ACM/SIGAPP Symposium on Applied Computing, AMC, Mar. 27, 2023, 9 pp.

\* cited by examiner

PROTECTED DATA RESTORATION USING CONFIDENTIAL COMPUTING

TECHNICAL FIELD

This disclosure relates to data platforms for computing systems.

BACKGROUND

Data platforms that support computing applications rely on primary storage systems to support latency sensitive applications. However, because primary storage is often more difficult or expensive to scale, a secondary storage system is often relied upon to support secondary use cases such as backup and archive.

SUMMARY

Aspects of this disclosure describe techniques for protected data restoration using confidential computing. Data security may involve protecting data at rest, data in transit, and data in use. Protecting data at rest prevents unauthorized access to data and protecting data in transit prevents man in the middle attacks such as data snooping attacks. Data in use protections protect against various attacks involving usage of data, such as system intrusion and privilege misuse. For example, a data platform may be vulnerable to system intrusion attacks where unauthorized parties obtain access by exploiting vulnerable applications or stolen credentials to exfiltrate data over time. As another example, a data platform may be vulnerable to privilege misuse where insiders (e.g., authorized users) with access to data intentionally or accidentally cause data to be exfiltrated to unauthorized parties.

Data encryption may not guarantee complete data protection in cases where unauthorized parties gain access to a data platform such as by system intrusion. For example, in the event of a successful system intrusion, an unauthorized party may access data encryption keys and, with the data encryption keys, the unauthorized party may decrypt and exfiltrate data. Similarly, privilege misuse may cause data encryption keys to become accessible thereby allowing encrypted data to be decrypted and exfiltrated by the unauthorized parties.

Some on-premises storage clusters may not utilize any root of trust, such as a certificate authority. As such, the unauthorized parties may obtain access to all data stored by such a cluster once unauthorized access to the cluster is achieved. Once such unauthorized access to the cluster is achieved, the unauthorized parties may also confiscate or delete encryption keys or other data necessary for authorized parties to access data.

The techniques described herein provide protected data restoration to prevent exfiltration of data by unauthorized parties. Various aspects of the techniques may provide data in use protections, such as to guard against system intrusion or privilege misuse, utilizing confidential computing. For example, a data platform in accordance with the described techniques may utilize an enclave of a trusted execution environment to control access to protected data (e.g., backups). To guard against system intrusion, privilege misuse, or other attacks, the data platform may utilize data encryption keys generated based on a plurality of individual units of distinct key data (e.g., a first random number and a second distinct random number) that must each be obtained to decrypt encrypted data.

For example, the data platform may encrypt data using one or more data encryption keys derived or generated from a plurality of individual units of distinct key data. Each individual unit of distinct key data must be obtained to derive a data encryption key capable of decrypting the encrypted data. Different units of distinct key data may be associated with different parties. For example, the first key data may be associated with a provider of the data platform while the second key data may be associated with an owner of the data. In accordance with the described techniques, even if the provider's systems are successfully attacked, the encrypted data cannot be decrypted since the owner's key data is required for decryption. Similarly, if the owner's systems are successfully attacked, the encrypted data cannot be decrypted without the provider's key data. At least one unit of key data may be protected through confidential computing, such as the enclave of the trusted execution environment.

The described techniques may provide one or more technical advantages that realize a practical application. For example, the described techniques improve security by preventing system intrusion and privilege misuse attacks through use of distinct units of key data, such that access to a single unit of key data is insufficient to permit decryption of data stored by the data platform. The security improvements result in reduced use of computing resources by preventing exfiltration of large amounts of data (e.g., gigabytes or terabytes of data) which present a security risk and consume significant computing resources.

Although the techniques described in this disclosure are primarily described with respect to a backup function of a data platform (e.g., restoring backups), similar techniques may be applied for an archive function (e.g., restoring archives) or other similar function of the data platform.

In one example, this disclosure describes a method comprising receiving, by a data platform implemented by a computing system, a request to restore an encrypted chunk of data, the encrypted chunk stored with first encrypted key data and second encrypted key data in a storage system by a storage cluster of the data platform, wherein the encrypted chunk is encrypted with a data encryption key generated based on first key data and second key data, the first key data distinct from the second key data, receiving, by an enclave implemented in a trusted execution environment of the data platform, the first encrypted key data and the second encrypted key data from the storage cluster, decrypting, by the enclave, the first encrypted key data to obtain the first key data and the second encrypted key data to obtain the second key data, securely sending, by the enclave, the first key data and the second key data to the storage cluster, generating, by the storage cluster and based on the first key data and the second key data, a derived data encryption key corresponding to the data encryption key, and decrypting, by the storage cluster, the encrypted chunk with the derived data encryption key to generate a decrypted chunk.

In another example, this disclosure describes a computing system comprising a memory storing instructions, and processing circuitry that executes the instructions to: receive a request to restore an encrypted chunk of data, the encrypted chunk stored with first encrypted key data and second encrypted key data in a storage system by a storage cluster of the data platform, wherein the encrypted chunk is encrypted with a data encryption key generated based on first key data and second key data, the first key data distinct from the second key data, receive, by an enclave implemented in a trusted execution environment of the processing circuitry, the first encrypted key data and the second encrypted key data from the storage cluster, decrypt, by the enclave, the first encrypted key data to obtain the first key data and the second encrypted key data to obtain the second key data, securely send, by the enclave, the first key data and the second key data to the storage cluster, generate, based on the first key data and the second key data, a derived data encryption key corresponding to the data encryption key, and decrypt the encrypted chunk with the derived data encryption key to generate a decrypted chunk.

In another example, this disclosure describes a computer-readable storage medium comprising instructions that, when executed, cause processing circuitry of a computing system to: receive a request to restore an encrypted chunk of data, the encrypted chunk stored with first encrypted key data and second encrypted key data in a storage system by a storage cluster of the data platform, wherein the encrypted chunk is encrypted with a data encryption key generated based on first key data and second key data, the first key data distinct from the second key data, receive, by an enclave implemented in a trusted execution environment of the processing circuitry, the first encrypted key data and the second encrypted key data from the storage cluster, decrypt, by the enclave, the first encrypted key data to obtain the first key data and the second encrypted key data to obtain the second key data, securely send, by the enclave, the first key data and the second key data to the storage cluster, generate, based on the first key data and the second key data, a derived data encryption key corresponding to the data encryption key, and decrypt the encrypted chunk with the derived data encryption key to generate a decrypted chunk.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference characters denote like elements throughout the text and figures.

DETAILED DESCRIPTION

Figure 1A:
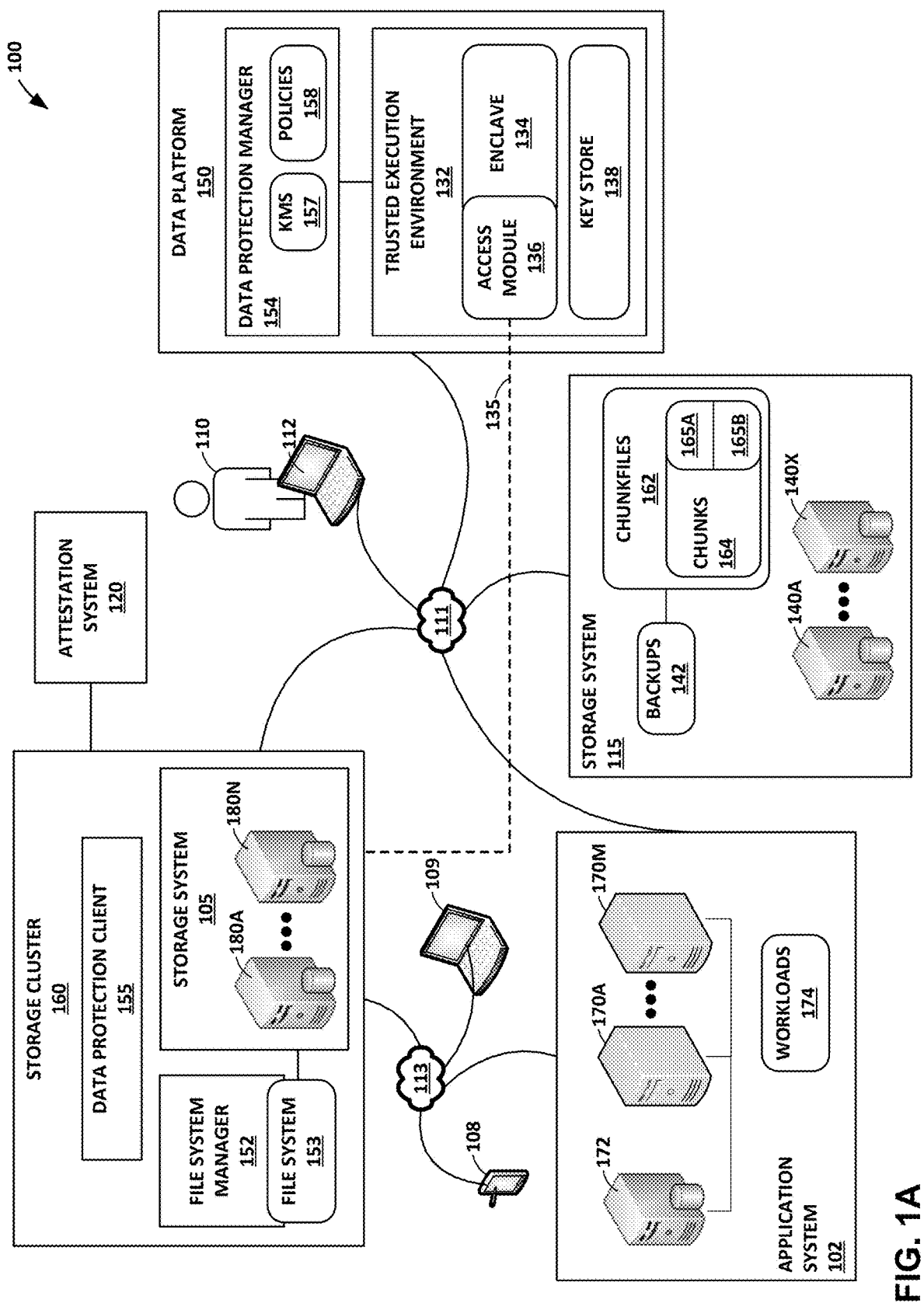
FIGS. 1A-1B are block diagrams illustrating example systems that perform protected data restoration using confidential computing, in accordance with techniques of this disclosure.
Figure 1B:
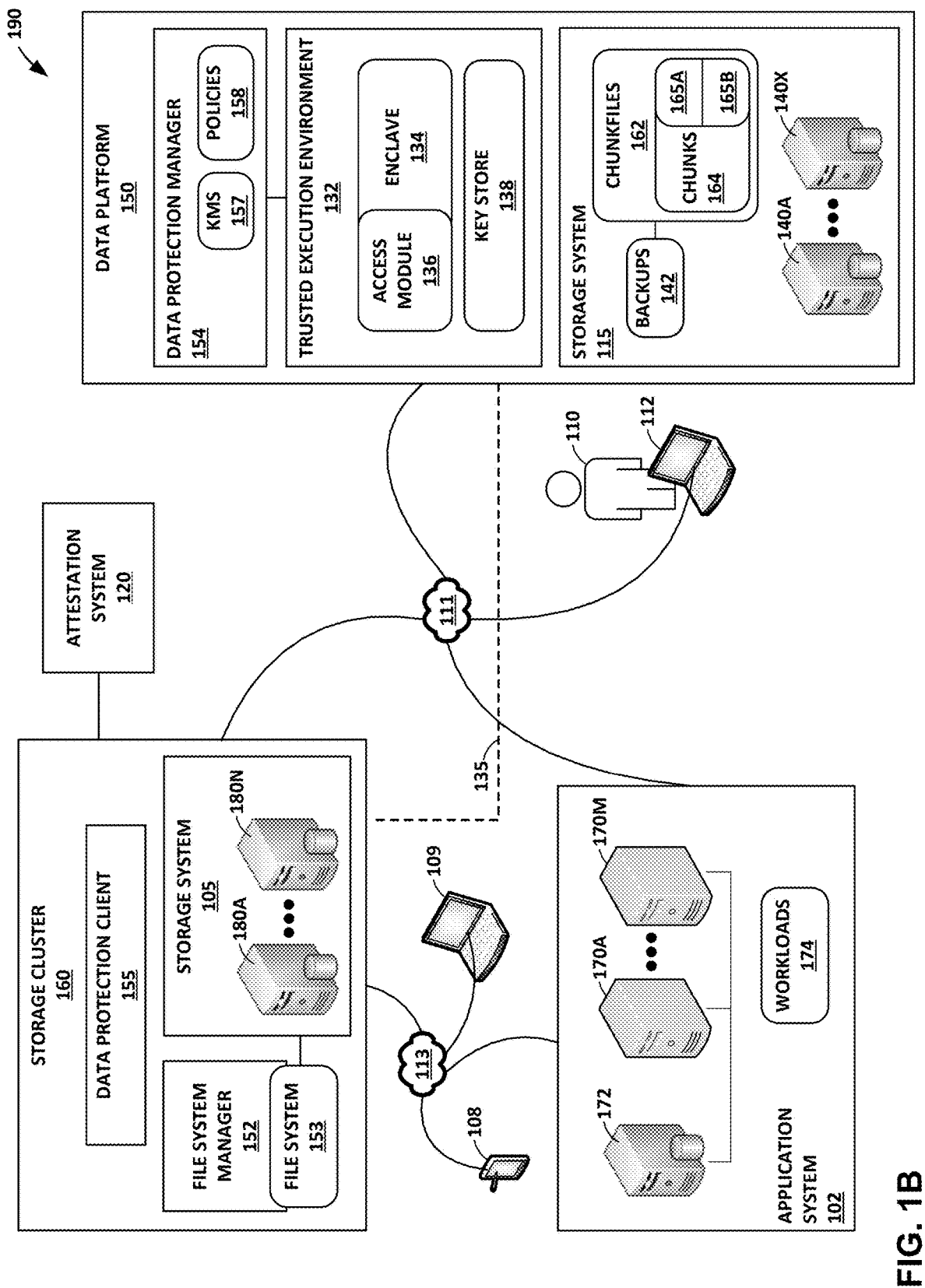

FIGS. 1A-1B are block diagrams illustrating example systems that perform data management across cloud environments, in accordance with one or more aspects of the present disclosure. In the example of FIG. 1A, system 100 includes application system 102. Application system 102 represents a collection of hardware devices, software components, and/or data stores that can be used to implement one or more applications or services provided to one or more mobile devices 108 and one or more client devices 109 via a network 113. Application system 102 may include one or more physical or virtual computing devices that execute workloads 174 for the applications or services. Workloads 174 may include one or more virtual machines, containers, Kubernetes pods each including one or more containers, bare metal processes, and/or other types of workloads.

In the example of FIG. 1A, application system 102 includes application servers 170A-170M (collectively, "application servers 170") connected via a network with database server 172 implementing a database. Other examples of application system 102 may include one or more load balancers, web servers, network devices such as switches or gateways, or other devices for implementing and delivering one or more applications or services to mobile devices 108 and client devices 109. Application system 102 may include one or more file servers. The one or more file servers may implement a primary file system for application system 102. (In such instances, file system 153 may be a secondary file system that provides backup, archive, and/or other services for the primary file system. Reference herein to a file system may include a primary file system or secondary file system, e.g., a primary file system for application system 102 or file system 153 operating as either a primary file system or a secondary file system.)

Application system 102 may be located on premises and/or in one or more data centers, with each data center a part of a public, private, or hybrid cloud. The applications or services may be distributed applications. The applications or services may support enterprise software, financial software, office or other productivity software, data analysis software, customer relationship management, web services, educational software, database software, multimedia software, information technology, health care software, or other type of applications or services. The applications or services may be provided as a service (-aaS) for Software-aaS (SaaS), Platform-aaS (PaaS), Infrastructure-aaS (IaaS), Data Storage-aas (dSaaS), or other type of service.

In some examples, application system 102 may represent an enterprise system that includes one or more workstations in the form of desktop computers, laptop computers, mobile devices, enterprise servers, network devices, and other hardware to support enterprise applications. Enterprise applications may include enterprise software, financial software, office or other productivity software, data analysis software, customer relationship management, web services, educational software, database software, multimedia software, information technology, health care software, or other type of applications. Enterprise applications may be delivered as a service from external cloud service providers or other providers, executed natively on application system 102, or both.

In the example of FIG. 1A, system 100 includes a data platform 150 that provides a file system 153 and archival functions to an application system 102, such as through storage cluster 160, storage system 105, and one or more separate storage systems 115A-115N. Data platform 150 may implement a distributed file system 153 at storage cluster 160 and a storage architecture to facilitate access by application system 102 to file system data and to facilitate the transfer of data between storage system 105 and application system 102 via network 111. With the distributed file system, data platform 150 enables devices of application system 102 to access file system data, via network 111, 113 using a communication protocol, as if such file system data was stored locally (e.g., to a hard disk of a device of application system 102). Example communication protocols for accessing files and objects include Server Message Block (SMB), Network File System (NFS), or AMAZON Simple Storage Service (S3). File system 153 may be a primary file system or secondary file system for application system 102.

File system manager 152 represents a collection of hardware devices and software components that implements file system 153 for storage cluster 160. Examples of file system functions provided by the file system manager 152 include storage space management including deduplication, file naming, directory management, metadata management, partitioning, and access control. File system manager 152 executes a communication protocol to facilitate access via network 111 by application system 102 to files and objects stored to storage system 105.

Storage cluster 160 may be located on premises and/or in one or more data centers, with each data center a part of a public, private, or hybrid cloud. Storage cluster 160 may comprise storage system 105 having one or more storage devices 180A-180N (collectively, "storage devices 180"). Storage devices 180 may represent one or more physical or virtual compute and/or storage devices that include or otherwise have access to storage media. Such storage media may include one or more of Flash drives, solid state drives (SSDs), hard disk drives (HDDs), forms of electrically programmable memories (EPROM) or electrically erasable and programmable (EEPROM) memories, and/or other types of storage media used to support data platform 150. Different storage devices of storage devices 180 may have a different mix of types of storage media. Each of storage devices 180 may include system memory. Each of storage devices 180 may be a storage server, a network-attached storage (NAS) device, or may represent disk storage for a compute device. Storage system 105 may be a redundant array of independent disks (RAID) system. In some examples, one or more of storage devices 180 are both compute and storage devices that execute software for storage cluster 160, such as file system manager 152 and data protection client 155 in the example of system 100, and store objects and metadata for data platform 150 to storage media. In some examples, separate compute devices (not shown) execute software for data platform 150, such as file system manager 152, data protection manager 154, and data protection client 155 in the example of system 100. Each of storage devices 180 may be considered and referred to as a "storage node" or simply as a "node". Storage devices 180 may represent virtual machines running on a supported hypervisor, a cloud virtual machine, a physical rack server, or a compute model installed in a converged platform.

In various examples, data platform 150 and storage cluster 160 runs on physical systems, virtually, or natively in the cloud. For instance, data platform 150 and storage cluster 160 may be deployed as one or more physical clusters, virtual clusters, or a cloud-based clusters running in a private, hybrid private/public, or public cloud deployed by a cloud service provider. Data platform 150 and storage cluster 160 may run on physical systems, virtually, or natively in the cloud that are local or remote from one another. For example, storage cluster 160 may be on premises while data platform runs on a remote physical, virtual, or native system. In some examples of system 100, multiple instances of storage cluster 160 may be deployed, and file system 153 may be replicated among the various instances. In some cases, data platform 150 is a compute cluster that represents a single management domain. The number of storage devices 180 may be scaled to meet performance needs.

Data platform 150 may implement and offer multiple storage domains to one or more tenants or to segregate workloads 174 that require different data policies. A storage domain is a data policy domain that determines policies for deduplication, compression, encryption, tiering, and other operations performed with respect to objects stored using the storage domain. In this way, data platform 150 may offer users the flexibility to choose global data policies or workload specific data policies. Data platform 150 may support partitioning.

A view is a protocol export that resides within a storage domain. A view inherits data policies from its storage domain, though additional data policies may be specified for the view. Views can be exported via SMB, NFS, S3, and/or another communication protocol. Policies that determine data processing and storage by data platform 150 may be assigned at the view level. A protection policy may specify a backup frequency and a retention policy, which may include a data lock period. Backups 142 created in accordance with a protection policy inherit the data lock period and retention period specified by the protection policy.

Each of network 113 and network 111 may be the internet or may include or represent any public or private communications network or other network. For instance, network 113 may be a cellular, Wi-Fi®, ZigBee®, Bluetooth®, Near-Field Communication (NFC), satellite, enterprise, service provider, and/or other type of network enabling transfer of data between computing systems, servers, computing devices, and/or storage devices. One or more of such devices may transmit and receive data, commands, control signals, and/or other information across network 113 or network 111 using any suitable communication techniques. Each of network 113 or network 111 may include one or more network hubs, network switches, network routers, satellite dishes, or any other network equipment. Such network devices or components may be operatively inter-coupled, thereby providing for the exchange of information between computers, devices, or other components (e.g., between one or more client devices or systems and one or more computer/server/storage devices or systems). Each of the devices or systems illustrated in FIGS. 1A-1B may be operatively coupled to network 113 and/or network 111 using one or more network links. The links coupling such devices or systems to network 113 and/or network 111 may be Ethernet, Asynchronous Transfer Mode (ATM) or other types of network connections, and such connections may be wireless and/or wired connections. One or more secure sessions 135 (e.g., secure communication links) may be established directly between devices or systems illustrated in FIGS. 1A-1B or through network 113 and/or network 111.

One or more of the devices or systems illustrated in FIGS. 1A-1B or otherwise on network 113 and/or network 111 may be in a remote location relative to one or more other illustrated devices or systems. For example, system 100 may be a hybrid cloud where storage cluster 160, application system 102, and data platform 150 are deployed on premises or to different public or private clouds. For instance, storage cluster 160, application system 102, or both may be located on premises and data platform 150 may be deployed at a remote location, such as at a public or private cloud.

Application system 102, using file system 153 provided by data platform 150, generates objects and other data that file system manager 152 creates, manages, and causes to be stored to storage system 105. For this reason, application system 102 may alternatively be referred to as a "source system," file system 153 for application system 102 may alternatively be referred to as a "source file system," and storage system 105 may alternatively be referred to as a "source storage system." Application system 102 may for some purposes communicate directly with storage system 105 via network 111, 113 to transfer objects, and for some purposes communicate with file system manager 152 via network 111, 113 to obtain objects or metadata indirectly from storage system 105. File system manager 152 generates and stores metadata to storage system 105. The collection of data stored to storage system 105 and used to implement file system 153 is referred to herein as file system data. File system data may include the aforementioned metadata and objects. Metadata may include file system objects, tables, trees, or other data structures; metadata generated to support deduplication; or metadata to support snapshots. Objects that are stored may include files, virtual machines, databases, applications, pods, container, any of workloads 174, system images, directory information, or other types of objects used by application system 102. Objects of different types and objects of a same type may be deduplicated with respect to one another.

Application system 102 and data platform 150 may be associated with distinct parties. For example, application system 102 may be operated by an enterprise, while data platform 150 may be provided to the enterprise, such as for use with application system 102, by a data platform provider. An administrator 110 of data platform provider configure, maintain, update, or otherwise manage data platform 150, such as through one or more client devices 112. As such, administrator 110 may have some privileged access to enterprise data stored including backups 142, as may be stored at storage system 115. As will be described further below, in accordance with the techniques described herein, data platform 150 may protect backups 142 from unauthorized access and exfiltration even when unauthorized parties gain access to administrator 110, client device 112, data platform 150, storage system 115, or various subsets thereof.

Data platform 150 includes data protection manager 154 that may store (e.g., create) and restore backups 142 of file system data for file system 153. Data protection manager 154 may include data protection client 155 that operates in conjunction with data protection manager 154 to store and restore backups 142. In the example of system 100, data protection manager 154 may store one or more backups 142 of file system data, stored by storage system 105, to one or more storage systems 115 via network 111.

Storage system 115 includes one or more storage devices 140A-140X (collectively, "storage devices 140"). Storage devices 140 may represent one or more physical or virtual compute and/or storage devices that include or otherwise have access to storage media. Such storage media may include one or more of Flash drives, solid state drives (SSDs), hard disk drives (HDDs), optical discs, forms of electrically programmable memories (EPROM) or electrically erasable and programmable (EEPROM) memories, and/or other types of storage media. Different storage devices of storage devices 140 may have a different mix of types of storage media. Each of storage devices 140 may include system memory. Each of storage devices 140 may be a storage server, a network-attached storage (NAS) device, or may represent disk storage for a compute device. Storage system 115 may include redundant array of independent disks (RAID) system. Storage system 115 may be capable of storing much larger amounts of data than storage system 105. Storage devices 140 may further be configured for long-term storage of information more suitable for archival purposes.

In some examples, storage system 105 and/or 115 may be a storage system deployed at and managed by a cloud storage provider and referred to as a "cloud storage system." Example cloud storage providers include, e.g., AMAZON WEB SERVICES (AWS®) by AMAZON, INC., AZURE® by MICROSOFT, INC., DROPBOX® by DROPBOX, INC., ORACLE CLOUD® by ORACLE, INC., and GOOGLE® CLOUD PLATFORM (GCP) by GOOGLE, INC. In some examples, storage system 115 is co-located with storage system 105 in a data center, on-prem, or in a private, public, or hybrid private/public cloud. Storage system 115 may be referred to as an "external target" for backups 142. Where deployed and managed by a cloud storage provider, storage system 115 may be referred to as "cloud storage." Storage system 115 may include one or more interfaces for managing transfer of data between storage system 105 and storage system 115 and/or between application system 102 and storage system 115. Data platform 150 that supports application system 102 relies on storage system 105 to support latency sensitive applications. However, because storage system 105 is often more difficult or expensive to scale, data platform 150 may use storage system 115 to support use cases such as backup and archive. In general, a file system backup is a copy of file system 153 to support protecting file system 153 for quick recovery, often due to some data loss in file system 153, and a file system archive ("archive") is a copy of file system 153 to support longer term retention and review. The "copy" of file system 153 may include such data as is needed to restore or view file system 153 in its state at the time of the backup or archive.

Data protection manager 154 may backup file system data for file system 153 at any time in accordance with backup policies 158 that specify, for example, backup periodicity and timing (daily, weekly, etc.), which file system data is to be stored, a backup retention period, storage location, access control, and so forth. An initial backup 142 of file system data corresponds to a state of the file system data at an initial backup time (the backup creation time of the initial backup). The initial backup may include a full backup of the file system data or may include less than a full backup of the file system data, in accordance with backup policies. For example, the initial backup may include all objects of file system 153 or one or more selected objects of file system 153.

One or more subsequent incremental backups 142 of the file system 153 may correspond to respective states of the file system 153 at respective subsequent backup creation times, i.e., after the backup creation time corresponding to the initial backup. A subsequent backup 142 may include an incremental backup of file system 153. A subsequent backup may correspond to an incremental backup of one or more objects of file system 153. Some of the file system data for file system 153 stored on storage system 105 at the initial backup creation time may also be stored on storage system 105 at the subsequent backup creation times. A subsequent incremental backup may include data that was not previously stored to storage system 115. File system data that is included in a subsequent backup may be deduplicated by data protection manager 154 against file system data that is included in one or more previous backups, including the initial backup, to reduce the amount of storage used. (Reference to a "time" in this disclosure may refer to dates and/or times. Times may be associated with dates. Multiple backups may occur at different times on the same date, for instance.)

In system 100, data protection manager 154 stores file system data to storage system 115 as backups 142, using chunkfiles 162. Data protection manager 154 may use any of backups 142 to subsequently restore the file system (or portion thereof) to its state at the backup creation time, or backup 142 may be used to create or present a new file system (or "view") based on backup 142, for instance. As noted above, data protection manager 154 may deduplicate file system data included in a subsequent backup 142 against file system data that is included in one or more previous backups. For example, a second object of file system 153 and included in a second backup 142 may be deduplicated against a first object of file system 153 and included in a first, earlier backup. Data protection manager 154 may remove a chunk of the second object and generate metadata with a reference (e.g., a pointer) to a stored chunk of chunks 164 in one of chunkfiles 162. The stored chunk in this example is an instance of a chunk stored for the first object.

Data protection manager 154 may apply deduplication as part of a write process of writing (i.e., storing) an object of file system 153 to one of backups 142 in storage system 115. Deduplication may be implemented in various ways. For example, the approach may be fixed length or variable length, the block size for the file system may be fixed or variable, and deduplication domains may be applied globally or by workload. Fixed length deduplication involves delimiting data streams at fixed intervals. Variable length deduplication involves delimiting data streams at variable intervals to improve the ability to match data, regardless of the file system block size approach being used. This algorithm is more complex than a fixed length deduplication algorithm but can be more effective for most situations and generally produces less metadata. Variable length deduplication may include variable length, sliding window deduplication. The length of any deduplication operation (whether fixed length or variable length) determines the size of the chunk being deduplicated.

In some examples, the chunk size can be within a fixed range for variable length deduplication. For instance, data protection manager 154 can compute chunks having chunk sizes within the range of 16-48 kB. Data protection manager 154 may eschew deduplication for objects that that are less than 16 kB. In some example implementations, when data of an object is being considered for deduplication, data protection manager 154 compares a chunk identifier (ID) (e.g., a hash value of the entire chunk) of the data to existing chunk IDs for already stored chunks. If a match is found, data protection manager 154 updates metadata for the object to point to the matching, already stored chunk. If no matching chunk is found, data protection manager 154 writes the data of the object to storage as one of chunks 164 for one of chunkfiles 162. Data protection manager 154 additionally stores the chunk ID in chunk metadata, in association with the new stored chunk, to allow for future deduplication against the new stored chunk. In general, chunk metadata is usable for generating, viewing, retrieving, or restoring objects stored as chunks 164 (and references thereto) within chunkfiles 162, for any of backups 142, and is described in further detail below.

Each of chunkfiles 162 includes multiple chunks 164. Chunkfiles 162 may be fixed size (e.g., 8 MB) or variable size. Chunkfiles 162 may be stored using a data structure offered by a cloud storage provider for storage system 115. For example, each of chunkfiles 162 may be one of an S3 object within an AWS cloud bucket, an object within AZURE Blob Storage, an object in Object Storage for ORACLE CLOUD, or other similar data structure used within another cloud storage provider storage system. Any of chunkfiles 162 may be subject to a write once, ready many (WORM) lock having a WORM lock expiration time. A WORM lock for an S3 object is known as an "object lock" and a WORM lock for an object within AZURE Blob Storage is known as "blob immutability."

The process of deduplication for multiple objects over multiple backups results in chunkfiles 162 that each have multiple chunks 164 for multiple different objects associated with the multiple backups. In some examples, different backups 142 may have objects that are effectively copies of the same data, e.g., for an object of the file system that has not been modified. An object of a backup may be represented or "stored" as metadata having references to chunks that enable the object to be accessed. Accordingly, description herein to a backup "storing," "having," or "including" an object includes instances in which the backup does not store the data for the object in its native form.

The initial backup and the one or more subsequent incremental backups may each be associated with a corresponding retention period and, in some cases, a data lock period for the backup. As described above, a data management policy (not shown) may specify a retention period for a backup and a data lock period for a backup. A retention period for a backup is the amount of time for which the backup and the chunks that objects of the backup reference are to be stored before the backup and the chunks are eligible to be removed from storage. The retention period for the backup begins when the backup is stored (the backup creation time). A chunkfile containing chunks that objects of a backup reference and that are subject to a retention period of the backup, but not subject to a data lock period for the backup, may be modified at any time prior to expiration of the retention period. The nature of such a modification must be such to preserve the data referenced by objects of the backup.

A user or application associated with application system 102 may have access (e.g., read or write) to a backup that is stored in storage system 115. The user or application may delete some of the data due to a malicious attack (e.g., virus, ransomware, etc.), a rogue or malicious administrator, and/or human error. The user's credentials may be compromised and as a result, the backup that is stored in storage system 115 may be subject to ransomware. To reduce the likelihood of accidental or malicious data deletion or corruption, in addition to the protections described herein, a data lock having a data lock period may be applied to a backup 142.

As described above, chunkfiles 162 may represent an object in a backup storage system (shown as "storage system 115," which may also be referred to as "backup storage system 115") that conform to an underlying architecture of backup storage system 115. Data platform 150 includes data protection manager 154 that supports storing backups 142 in the form of chunkfiles 162, which interface with backup storage system 115 to store chunkfiles 162 after forming chunkfiles 162 from one or more chunks 164 of data. Data protection manager 154 may apply a process referred to as "deduplication" with respect to chunks 164 to remove redundant chunks and generate metadata linking redundant chunks to previously stored chunks 164 and thereby reduce storage consumed (and thereby reduce storage costs in terms of storage required to store the chunks).

Data protection manager 154 may protect backups 142, archives, or other copies of file system data by controlling access to backups 142. For example, data protection manager 154, such as through data protection client 155, may encrypt chunks 164 of backup 142 prior to storage on storage system 115 and require user authentication prior to decryption of encrypted chunks 164. As is described further herein, data protection manager 154 may utilize key encryption keys that are each generated with a plurality of individual units of distinct key data (e.g., first key data and distinct second key data), such as different random numbers or different random data. Each individual unit of distinct key data must be obtained before chunk 164 can be decrypted.

Some data platforms may utilize multiple key management systems that each issue data encryption keys, which may prevent data exfiltration should a particular one of the data encryption keys be obtained by an unauthorized party. For example, a primary cluster and storage service provider platform may each issue data encryption keys, with both being required to decrypt data. If the primary cluster is compromised access to all data may be obtained and the unauthorized party may confiscate or delete the data encryption key stored by the primary cluster, leaving the data owner unable to decrypt their own data.

In accordance with the techniques described herein, data protection manager 154 may perform one or more management functions (e.g., creation, deletion, revision, storage, authentication, validation, access control) for encryption information (e.g., key data, encryption keys, including data encryption keys, certificates), authentication information (e.g., usernames or user identifiers and passwords) related to encryption and/or decryption of chunks 164. In some examples, data protection manager 154 may perform at least some management functions through use of confidential computing. Some examples of confidential computing platforms include INTEL® SGX/TDX by INTEL Corporation, AMD® SEV by ADVANCED MICRO DEVICES, INC., AWS NITRO SYSTEM® by AMAZON, Inc., NVIDIA® H100 by NVIDIA Corporation, AZURE® CONFIDENTIAL COMPUTE by MICROSOFT Corporation, and GOOGLE® CLOUD by ALPHABET Inc.

In some examples, data protection manager 154 may create one or more enclaves 155 that provide particular management functions and execute within a trusted execution environment 132 of a confidential computing platform or system. Trusted execution environment 132 may comprise isolated hardware, such as isolated processing circuitry of one or more processors, one or more protected memory regions, or both. Trusted execution environment 132 may be considered secure or "trusted" in that trusted execution environment is isolated such that operating system, application, or other software, regardless of privilege level, cannot directly access or modify instructions within the hardware regions.

Trusted execution environment 132 may be verified with attestation system 120 to ensure the integrity of trusted execution environment 132 (e.g., that software and/or hardware of trusted execution environment 132 are genuine and unadulterated). In some examples, in response to a verification request, trusted execution environment 132 may generate an attestation for verification by attestation system 120. Attestation system 120 may be a third party trust authority, such as an INTEL® Trust Authority by INTEL Corporation, that can evaluate an attestation and verify whether trusted execution environment 132 is genuine or legitimate. The attestation may include evidence that, if verified by attestation system 120, establishes the integrity of trusted execution environment 132 (e.g., that the trusted execution environment 132 is genuine or, in other words, not security compromised). Data platform 150 may receive an indication of the validity or invalidity of the attestation from attestation system 120 after attestation system 120 validates, or is unable to validate, the attestation. Data platform 150 may disable one or more functions in response to receiving an indication that the attestation is invalid. For example, data platform 150 may disable trusted execution environment 132 to prevent use of the trusted execution environment 132, components within trusted execution environment 132, (e.g., enclave 134 and key store 138), or both. Data platform 150 may enable or refrain from disabling trusted execution environment 132 in response to receiving an indication that the attestation is valid. For example, data platform 150 may create enclave 134 within trusted execution environment 132, as described below, when the attestation is valid.

Verification of trusted execution environment 132 may be requested from and received by various systems or devices of data platform 150. For example, data protection client 155 of storage cluster 160 may request and receive verification of trusted execution environment 132 by attestation system 120. Though shown as connected to data platform 150 at storage cluster 160, attestation system 120 may communicate attestations and indications of validity or invalidity with data platform 150 and trusted execution environment 132 through other connections, such as via network 111. Trusted execution environment 132 may be verified by various parties periodically or on demand to ensure the integrity of trusted execution environment 132. In some examples, verification of trusted execution environment 132 includes verification of software and/or hardware within trusted execution environment 132, such as enclave 134, access module 136, key store 138, or various subsets thereof.

In response to successful verification of trusted execution environment 132, data protection manager 154 may create enclave 134 within trusted execution environment 132, such as in a protected memory region of data platform 150. Enclave 134 may comprise access module 136 that provides access to functions of enclave 134 to elements outside of trusted execution environment 132. For example, access module 136 may establish one or more secure sessions 135 (e.g., secured communication) between enclave 134 and storage cluster 160, as shown in the example of FIG. 1A, or other devices or systems outside of trusted execution environment 132, such as data protection manager 154, storage systems 105, 115, client device 112, and application system 102 to securely communicate with such devices or systems.

In some examples, access module 136 may implement an API or remote procedure call framework (e.g., GRPC) to provide access to functions or data of trusted execution environment 132 (e.g., enclave 134 and key store 138). For instance, enclave 134 may store encryption information in key store 138 and data protection client 155 may access the encryption information in key store 138 via secure session 135 and access module 136. In some examples, data protection manager 154 may create a protected memory region within trusted execution environment 132 to create key store 138.

Data protection manager 154 may initialize or establish (e.g., generate and store) various encryption information in preparation for protecting backups 142. For example, data protection manager 154 may generate key encryption keys and individual units of distinct key data (e.g., two distinct random numbers). Data protection manager 154 may encrypt individual units of key data with individual key encryption keys. In some examples, data protection manager 154 may generate key encryption keys using distinct elements of data platform. For instance, in some examples, key management system ("KMS") 157 may generate a first key encryption key, which may be referred to as a KMS key encryption key ("KMS KEK"), while enclave 134 may generate a second key encryption key, which may be referred to as an enclave key encryption key ("enclave KEK"). Key encryption keys may be certificates of a public key infrastructure ("PKI"), in some examples. A PKI may include certificates including public keys for encrypting data and counterpart private keys for decrypting data.

In some examples, individual key encryption keys may be associated with different parties. For example, a first key encryption key may belong to or be assigned to a first party while a second key encryption key may belong to or be assigned to a second party. Examples of such parties, include data owners, which may be an enterprise or other user of application system 102, and data platform providers (e.g., administrator 112), which may be parties that provide data platform 150. As such, a successful attack against devices or systems of one party does not allow data to be decrypted or exfiltrated.

Data protection manager 154 may store one or more key encryption keys at one or more locations, such as in storage system 105, key store 138, or both. For example, data protection manager 154 may store enclave KEK in key store 138 of trusted execution environment 132 and may store KMS KEK in other storage, such as in a storage area of KMS 157 or storage system 105. In some examples, KMS KEK may be stored in key store 138 along with enclave KEK. Since key store 138 is within trusted execution environment 132, data protection manager 154 may store data, such as KMS KEK, in key store 138 via access module 136 enclave 134. For example, data protection manager 154 may make a function call to access module 136 to store KMS KEK in key store 138. Enclave 134 may seal key encryption keys, as well as other data stored in trusted execution environment 132 using a sealing process of trusted execution environment 132, to further protect the key encryption keys from unauthorized access. For example, enclave 134 may seal key encryption keys by "wrapping" and/or assigning particular platform measurements or characteristics to the key encryption keys, such as by encrypting key encryption keys using the platform measurements or characteristics. Continuing this example, the key encryption keys may only be unsealed (e.g., "unwrapped") when the platform measurements or characteristics match those used to seal the key encryption keys. For instance, sealed key encryption keys may not be decrypted when platform measurements or characteristics differ from those used to seal the key encryption keys.

Data protection manager 154 may initialize or establish authentication information such as to allow an authorized user, such as an owner, administrator, or other user, to create and restore backups 142. For example, data protection manager 154 may setup a username and password or other authentication information for a user (e.g., administrator 110) that permits the user to login, manage, or otherwise access data platform 150, such as to create and restore backups 142. In some examples, data protection manager 154 may require and establish multi-factor authentication ("MFA"), such as via a time-based one-time password ("TOTP"), for users. Parameters for MFA may be securely stored in trusted execution environment 132. For example, enclave 134 may encrypt and store shared parameters for a TOTP in key store 138. Enclave 134 may generate or be assigned a public key of a PKI with which parameters, such as the shared parameters for the TOTP, may be encrypted. Enclave 134 may seal the parameters in key store 138 using a sealing process of trusted execution environment 132 to further protect the parameters from unauthorized access.

As described above, storage cluster 160 may include data protection client 155 that operates in conjunction with data protection manager 154 to protect backups 142. In some examples, data protection client 155 may protect backups 142 by encrypting chunks 164 of backups 142 in accordance with the techniques described herein. For example, data protection client 155 may utilize a plurality of individual units of distinct key data to generate a data encryption key used to encrypt chunks 164. Each individual unit of distinct key data may contain distinct data relative to other units of key data for a given chunk 164 or group of one or more chunks 164. In this manner, unauthorized access to key data for a particular chunk 164 or group of chunks 164 does not allow decryption of other chunks 164. Data protection client 155 may generate a random number or random data to generate a unit of key data. For example, data protection client 155, may generate first key data (e.g., a first random number) and second key data (e.g., a second distinct random number). As will be described further below, each individual unit of distinct key data must be obtained to decrypt chunks 164 and restore backup 142.

To encrypt chunk 164, data protection client 155 may generate or derive a data encryption key using the individual units of distinct key data. For example, data protection client 155 may execute a hash-based key derivation function ("HKDF") with the individual units of distinct key data (e.g., first key data and second key data) as input to generate a data encryption key. Data protection client 155 may encrypt a chunk with the data encryption key to generate encrypted chunk 164.

Data protection client 155 may encrypt the individual units of distinct key data to generate encrypted key data 165. For example, data protection client 155 may encrypt the first key data with a first key encryption key, such as the KMS KEK described above, to generate first encrypted key data 165A and may encrypt the second key data with a second key encryption key, such as the enclave KEK described above, to generate second encrypted key data 165B. Data protection client 155 may retrieve key encryption keys via data protection manager 154. For example, data protection client 155 may retrieve KMS KEK from KMS 157 and retrieve enclave KEK from key store 138 via a function call to access module 136 of trusted execution environment 132. Though described with first key data and second key data as an example, additional individual units of distinct key data may be used in some examples.

As can be seen in the example of FIG. 1A, data protection client 155 may store individual units of encrypted key data 165 along with encrypted chunk 164 in storage system 115. Continuing the above example, data protection client 155 may store first encrypted key data 165A and second encrypted key data 165B along with encrypted chunk 164 in storage system 115. In the examples above, data protection client 155 is described as performing the above processes to allow certain functions, such as generation of the individual units of key data and the data encryption key, to occur on premises or remote from data protection manager 154. In this manner, data encryption keys are only known at storage cluster 160 during backup and restore (e.g., encryption and decryption of chunks 164).

To decrypt encrypted chunk 164 stored in storage system 115, each individual unit of key distinct data used to encrypt chunk 164 is required. For instance, continuing the above example, the first key data, contained in first encrypted key data 165A, and the second key data, contained in second encrypted key data 165B, are required to generate a data encryption key capable of decrypting encrypted chunk 164. As such, unauthorized parties that have successfully gained access to data platform 150, storage system 115, or both cannot decrypt encrypted chunk 164 without also compromising trusted execution environment 132 to gain access to the key encryption key (e.g., enclave KEK) stored therein, and vice versa. Backups 142 are thus protected against system intrusion and privilege misuse as well as other attacks.

As described above, the enclave KEK may be stored in key store 138 of trusted execution environment 132 while the KMS KEK may be stored outside of trusted execution environment 132, such as in storage system 105. An unauthorized party, having successfully performed a system intrusion on data platform 150, may have access to the KMS KEK. The unauthorized party must also gain unauthorized access to trusted execution environment 132 to access the enclave KEK. In this example, the unauthorized party may be able to decrypt first encrypted key data 165A with the KMS KEK to obtain the first key data. Without access to the enclave KEK, the unauthorized party cannot decrypt second encrypted key data 165B and therefore cannot obtain the second key data. Without the second key data, the data encryption key cannot be derived and encrypted chunk 164 cannot be decrypted.

Data protection manager 154 may likewise protect against privilege misuse through a plurality of individual units of distinct key data and confidential computing. For example, an unauthorized party may be administrator 110, such as if administrator 110 intentionally or accidentally compromises data platform 150 through intentional or accidental privilege misuse. The compromise of data platform 150 may provide unauthorized access to the KMS KEK and allow unauthorized decryption of first encrypted key data 165A. Without access to the enclave KEK, second encrypted key data 165B cannot be decrypted to obtain the second key data. Accordingly, the data encryption key for encrypted chunk 164 cannot be derived and encrypted chunk 164 cannot be decrypted despite the privilege misuse.

Though perhaps unlikely, an unauthorized party, having gained access to trusted execution environment 132, such as key store 138 thereof, may access the enclave KEK and decrypt second encrypted key data 165B to obtain the second key data. In this example, the unauthorized party cannot derive the data encryption key for encrypted chunk 164 without the first key data. Without compromising data platform 150, unauthorized party cannot access the KMS KEK and, as such, cannot decrypt first encrypted key data 165A to obtain the first key data. Without first key data, data encryption key for encrypted chunk 164 cannot be derived and encrypted chunk 164 cannot be decrypted.

Unauthorized access to trusted execution environment 132 may be considered unlikely due to various characteristics of trusted execution environment 132 and the elements thereof. For example, trusted execution environment 132 is isolated (e.g., physically separate) from other execution environments and is not accessible to operating system and application software regardless of privilege level. In some examples, enclave 134 of trusted execution environment 132 may only include the set of functions attributed therewith, as described herein, thereby reducing the attack surface, for example, as compared to the attack surface of an operating system or application software (which are significantly more complex, and therefore present a larger attack surface relative to isolated trusted execution environment 132). Data platform 150 may also repeatedly verify trusted execution environment 132 through attestation system 120 periodically or on demand to further reduce the likelihood of successful unauthorized access. For example, an enterprise or other user of application system 120 or administrator 110 may initiate verification of trusted execution environment 132 periodically or on demand, such as through data platform 150, application system 120, or client 112 or other systems or devices, to repeatedly confirm the integrity of trusted execution environment 132. In some examples, data protection client 155 may automatically verify the integrity of trusted execution environment 132 as a prerequisite to restoring backup 142, such as in response to a request to restore backup 142.

Data protection client 155 may perform protected data restoration of backups 142. To restore backup 142, data protection client 155 may decrypt one or more encrypted chunks 164 of backup 142 and store the resulting decrypted data or chunks to restore backup 142. For example, data protection client 155 may store data from one or more decrypted chunks 164 in storage device 105 to thereby restore a file system 153 of storage cluster 160 to storage system 105. In some examples, data protection client 155 may store data from one or more decrypted chunks 164 at application system 102 to thereby restore file system 153 of storage cluster to application system 102.

To decrypt encrypted chunk 164, data protection client 155 may retrieve encrypted chunk 164 from storage system 115 along with the units of encrypted key data 165 stored along with the encrypted chunk 164. For example, data protection client 155 may retrieve encrypted chunk 164 along with first encrypted key data 165A and second encrypted key data 165B from storage system 115. Data protection client 155 may then obtain the individual units of key data (e.g., decrypt first encrypted key data 165A and second encrypted key data 165B) necessary to generate or derive a data encryption key capable of decrypting encrypted chunk 164, as will now be described.

In some examples, data protection manager 154 may authenticate a user prior to allowing backup 142 to be restored. For example, data protection manager 154 may receive and verify authentication information, such as a username and password, from a user. Data protection manager 154 may subsequently receive and verify authentication information for MFA, such as a TOTP, from the user. Authentication information may be encrypted prior to transmission to data protection manager 154. For example, a TOTP or other authentication information, may be encrypted, such as with a public key assigned to enclave 134. Data protection manager 154 may compare authentication information received from the user (e.g., TOTP) with counterpart authentication information (e.g., TOTP) stored in trusted execution environment 132 to verify the authentication information.

If authentication succeeds, data protection manager 154, may create a restore policy for the authenticated user at enclave 134. The restore policy may be considered a just-in-time ("JIT") restore policy in that the restore policy may be created on demand in response to a restore request, a particular authenticated user, or both. Data protection manager 154 may include session encryption information, such as a public key or certificate of a PKI, which may be used by enclave 134 to establish secure session 135 between enclave 134 and data protection client 155. In some examples, secure session 135 may be an encrypted communication link between enclave 134 and data protection client 155.

Data protection client 155 may transmit units of encrypted key data 165 (e.g., first encrypted key data 165A and second encrypted key data 165B) over secure session 135 to enclave 134. Enclave 134 may decrypt units of encrypted key data 165 to obtain the individual units of distinct key data encoded therein. For example, enclave 134 may decrypt first encrypted key data 165A to obtain the first key data and decrypt second encrypted key data 165B to obtain the second key data. Enclave 134 may retrieve key encryption keys and use the key encryption keys to decrypt encrypted key data 165. For example, enclave 134 may retrieve the KMS KEK from KMS 157 and decrypt first encrypted key data 165A with KMS KEK and retrieve enclave KEK from key store 138 and decrypt second encrypted key data 165B with enclave KEK.

After decryption, enclave 134 may securely transmit individual units of distinct key data to data protection client 155 through secure session 135. For example, enclave 134 may transmit the first key data and the second key data obtained, respectively, by decrypting first encrypted key data 165A and second encrypted key data 165B to data protection client 155 through secure session 135. Data protection client 155 may generate or derive a data encryption key using the individual units of distinct key data (e.g., first key data and second key data) received from enclave 134. For example, data protection client 155 may generate a data encryption key by executing a key derivation function (e.g., HKDF) using the first key data and the second key data as input and decrypt encrypted chunk 164 with the derived data encryption key.

As can be seen, in accordance with the techniques described herein, security is improved, such as against system intrusion and privilege misuse attacks, through use of distinct units of key data (e.g., first key data and second key data), such that access to a single unit of key data is insufficient to permit decryption of encrypted data chunk 164 by data platform 150. The security improvements result in reduced use of computing resources by preventing exfiltration of large amounts of data (e.g., gigabytes or terabytes of data) which present a security risk and consume significant computing resources.

System 190 of FIG. 1B is a variation of system 100 of FIG. 1A in that data platform 150 may store backups 142 using chunkfiles 162 stored on backup storage system 115 that is on premises or local to data platform 150. In some examples of system 190, storage system 115 enables users or applications to create, modify, or delete chunkfiles 162 via file system manager 152. In system 190, storage cluster 160 or storage system 105 of FIG. 1B may be a primary storage cluster 160 or primary storage system 105 used by system 190 or data platform 150 for initially storing and accumulating chunks 164 prior to backup to storage systems 115. Though not shown, in some examples, storage cluster 160, storage system 105, or both may be on premises or local to data platform 150, regardless of whether or not storage system 115 is remote or local to data platform 150.

Figure 2:
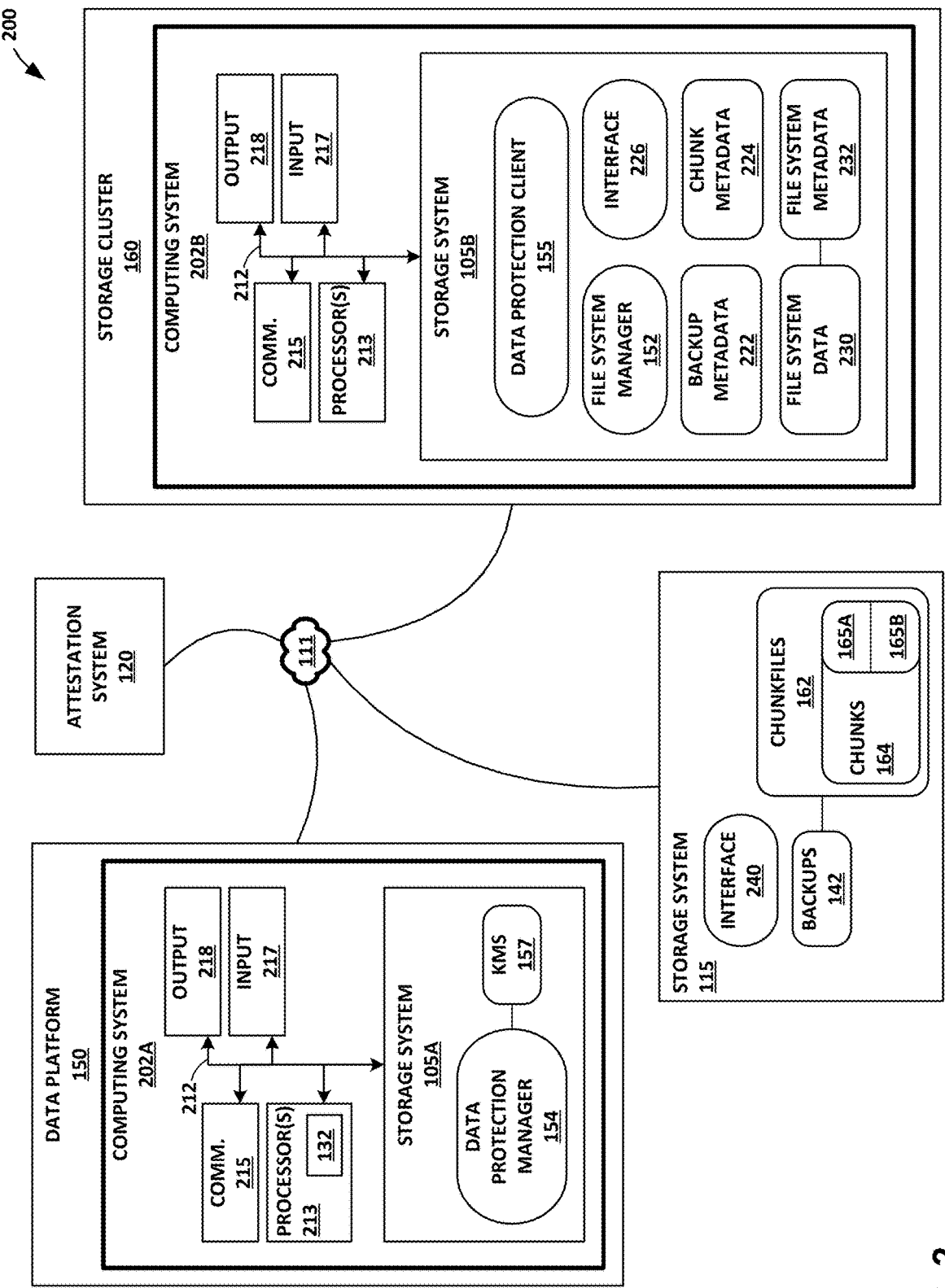
FIG. 2 is a block diagram illustrating example system that performs protected data restoration using confidential computing, in accordance with techniques of this disclosure.

FIG. 2 is a block diagram illustrating example system 200, in accordance with techniques of this disclosure. System 200 of FIG. 2 may be described as an example or alternate implementation of system 100 of FIG. 1A or system 190 of FIG. 1B (where chunkfiles 162 are written to a local storage system 115). One or more aspects of FIG. 2 may be described herein within the context of FIG. 1A and FIG. 1B.

In the example of FIG. 2, system 200 includes network 111, data platform 150 implemented by computing system 202A, storage cluster 160 implemented by computing system 202B, backup storage system 115, and attestation system 120. As such, as shown in the example of FIG. 2, storage cluster 160 may be a remote device or system of data platform 150. For example, storage cluster 160 may be deployed at a first location (e.g., on premises) while data platform 150 may be deployed at a second location (e.g., a public cloud). In FIG. 2, network 111, data platform 150, storage cluster 160, and storage system 115 may correspond to network 111, data platform 150, storage cluster 160, and storage system 115 of FIG. 1A. Different instances of storage system 115 may be deployed by distinct cloud service providers, the same cloud service provider, by an enterprise, or by other entities.

As can be seen from the example of FIG. 2, data platform 150 and storage cluster 160 may be implemented by computing systems 202 comprising the same or similar components in some examples. Computing system 202 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 202 represents a cloud computing system, server farm, and/or server cluster (or portion thereof) that provides services to other devices or systems. In other examples, computing system 202 may represent or be implemented through one or more virtualized compute instances (e.g., virtual machines, containers) of a cloud computing system, server farm, data center, and/or server cluster.

In the example of FIG. 2, computing system 202 may include one or more communication units 215, one or more input devices 217, one or more output devices 218, and one or more storage devices of a local storage system 105. Local storage system 105 may include various elements. For example, local storage system 105A of data platform 150 may include data protection manager 154 and KMS 157 and local storage system 105B of storage cluster 160 may include interface module 226, file system manager 152, and data protection client 155. One or more of the devices, modules, storage areas, or other components of computing system 202 may be interconnected to enable inter-component communications (physically, communicatively, and/or operatively). In some examples, such connectivity may be provided through communication channels (e.g., communication channels 212), which may represent one or more of a system bus, a network connection, an inter-process communication data structure, or any other method for communicating data.

One or more processors 213 of computing system 202 may implement functionality and/or execute instructions associated with computing system 202 or associated with one or more modules illustrated in FIG. 2 and described below. One or more processors 213 may be, may be part of, and/or may include processing circuitry that performs operations in accordance with one or more aspects of the present disclosure. Examples of processors 213 include microprocessors, application processors, display controllers, auxiliary processors, one or more sensor hubs, and any other hardware configured to function as a processor, a processing unit, or a processing device. Computing system 202 may use one or more processors 213 to perform operations in accordance with one or more aspects of the present disclosure using software, hardware, firmware, or a mixture of hardware, software, and firmware residing in and/or executing at computing system 202. As shown by computing system 202A, one or more processors 213 may include one or more trusted execution environments 132. In some examples, trusted execution environment 132 may comprise processing circuitry, memory, or both that is isolated from the remaining hardware of processor 213. For instance, trusted execution environment 132 may comprise physically isolated processing circuitry, memory or both with processor 213.

One or more communication units 215 of computing system 202 may communicate with devices external to computing system 202 by transmitting and/or receiving data, and may operate, in some respects, as both an input device and an output device. In some examples, communication units 215 may communicate with other devices over a network. In other examples, communication units 215 may send and/or receive radio signals on a radio network such as a cellular radio network. In other examples, communication units 215 of computing system 202 may transmit and/or receive satellite signals on a satellite network. Examples of communication units 215 include a network interface card (e.g., such as an Ethernet card), an optical transceiver, a radio frequency transceiver, a GPS receiver, or any other type of device that can send and/or receive information. Other examples of communication units 215 may include devices capable of communicating over Bluetooth®, GPS, NFC, ZigBee®, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth®, NFC, or other technologies or protocols.

One or more input devices 217 may represent any input devices of computing system 202 not otherwise separately described herein. Input devices 217 may generate, receive, and/or process input. For example, one or more input devices 217 may generate or receive input from a network, a user input device, or any other type of device for detecting input from a human or machine.

One or more output devices 218 may represent any output devices of computing system 202 not otherwise separately described herein. Output devices 218 may generate, present, and/or process output. For example, one or more output devices 218 may generate, present, and/or process output in any form. Output devices 218 may include one or more USB interfaces, video and/or audio output interfaces, or any other type of device capable of generating tactile, audio, visual, video, electrical, or other output. Some devices may serve as both input and output devices. For example, a communication device may both send and receive data to and from other systems or devices over a network.

One or more storage devices of local storage system 105 within computing system 202 may store information for processing during operation of computing system 202, such as random access memory (RAM), Flash memory, solid-state disks (SSDs), hard disk drives (HDDs), etc. Storage devices may store program instructions and/or data associated with one or more of the modules described in accordance with one or more aspects of this disclosure. One or more processors 213 and one or more storage devices may provide an operating environment or platform for such modules, which may be implemented as software, but may in some examples include any combination of hardware, firmware, and software. One or more processors 213 may execute instructions and one or more storage devices of storage system 105 may store instructions and/or data of one or more modules. The combination of processors 213 and local storage system 105 may retrieve, store, and/or execute the instructions and/or data of one or more applications, modules, or software. Processors 213 and/or storage devices of local storage system 105 may also be operably coupled to one or more other software and/or hardware components, including, but not limited to, one or more of the components of computing system 202 and/or one or more devices or systems illustrated as being connected to computing system 202.

File system manager 152 may perform functions relating to providing file system 153, as described above with respect to FIG. 1A. File system manager 152 may generate and manage file system metadata 232 for structuring file system data 230 for file system 153, and store file system metadata 232 and file system data 230 to local storage system 105. File system metadata 232 may include one or more trees that describe objects within file system 153 and the file system 153 hierarchy, and can be used to write or retrieve objects within file system 153. File system manager 152 may interact with and/or operate in conjunction with one or more modules of computing system 202, including interface module 226 and data protection manager 154.

Data protection manager 154 and data protection client 155 may perform backup functions relating to storing or creating backups 142 of file system 153, as described above with respect to FIG. 1A, including the operations described above with respect to encrypting and decrypting chunks 164. Data protection manager 154 may generate one or more backups 142 and cause file system data 230 to be stored as chunks 164 within chunkfiles 162 in backup storage system 115. Data protection manager 154 may apply an adaptive deduplication process to selectively deduplicate chunks of objects within file system data 230, in accordance with one or more policies 158. Data protection manager 154 may generate and manage chunk metadata 224 for generating, viewing, retrieving, or restoring any of backups 142. Backup metadata 222 may include respective original data lock periods for backups 142. Data protection manager 154 may generate and manage chunk metadata 224 for generating, viewing, retrieving, or restoring objects stored as chunks 164 (and references thereto) within chunkfiles 162, for any of backups 142. Stored objects may be represented and manipulated using logical files for identifying chunks for the objects.

Local storage system 105B may store chunk metadata 224 including a chunk table that describes chunks 164. The chunk table may include respective chunk IDs for chunks 164 and may contain pointers to chunkfiles 162 and offsets within chunkfiles 162 for retrieving chunks 164 from one or more storage systems 115 of one or more cloud environments 130. Chunks 164 are written into chunkfiles 162 at different offsets. By comparing new chunk IDs to the chunk table, data protection manager 154 can determine if the data already exists on the system. Data protection manager 154 may use the chunk table to look up the chunkfile identifier for the chunkfile that contains a chunk.

Local storage system 105B may include a chunkfile table that describes respective physical or virtual locations of chunkfiles 162 on storage system 115, along with other metadata about the chunkfile, such as a checksum, encryption data, compression data, etc. For example, in FIG. 2, data protection manager 154 may cause chunk metadata 224 including a chunkfile table to be stored to local storage system 105B. Data protection manager 152, optionally or in conjunction with file system manager 152, may use chunk metadata 224 to restore any of backups 142 to a file system implemented by data platform 150, which may be presented by file system manager 152 to other systems.

Interface module 226 may execute an interface by which other systems or devices may determine operations of file system manager 152 or data protection manager 154. Another system or device may communicate via an interface of interface module 226 to specify one or more policies 158.

System 200 may be modified to implement an example of system 190 of FIG. 1B. In the modified system 200, chunkfiles 162 are stored to a local backup storage system 115 to support backups 142.

Interface module 240 of backup storage system 115 may execute an interface by which other systems or devices may create, modify, delete, or extend a WORM lock expiration time for any of chunkfiles 162. Interface module 240 may execute and present an API. The interface presented by interface module 240 may be a gRPC, HTTP, RESTful, command-line, graphical user, web, or other interface. Interface module 240 may be associated with use costs. One more methods or functions of the interface module 240 may impose a cost per-use (e.g., $0.10 to extend a WORM lock expiration time of chunkfiles 162).

Figure 3A:
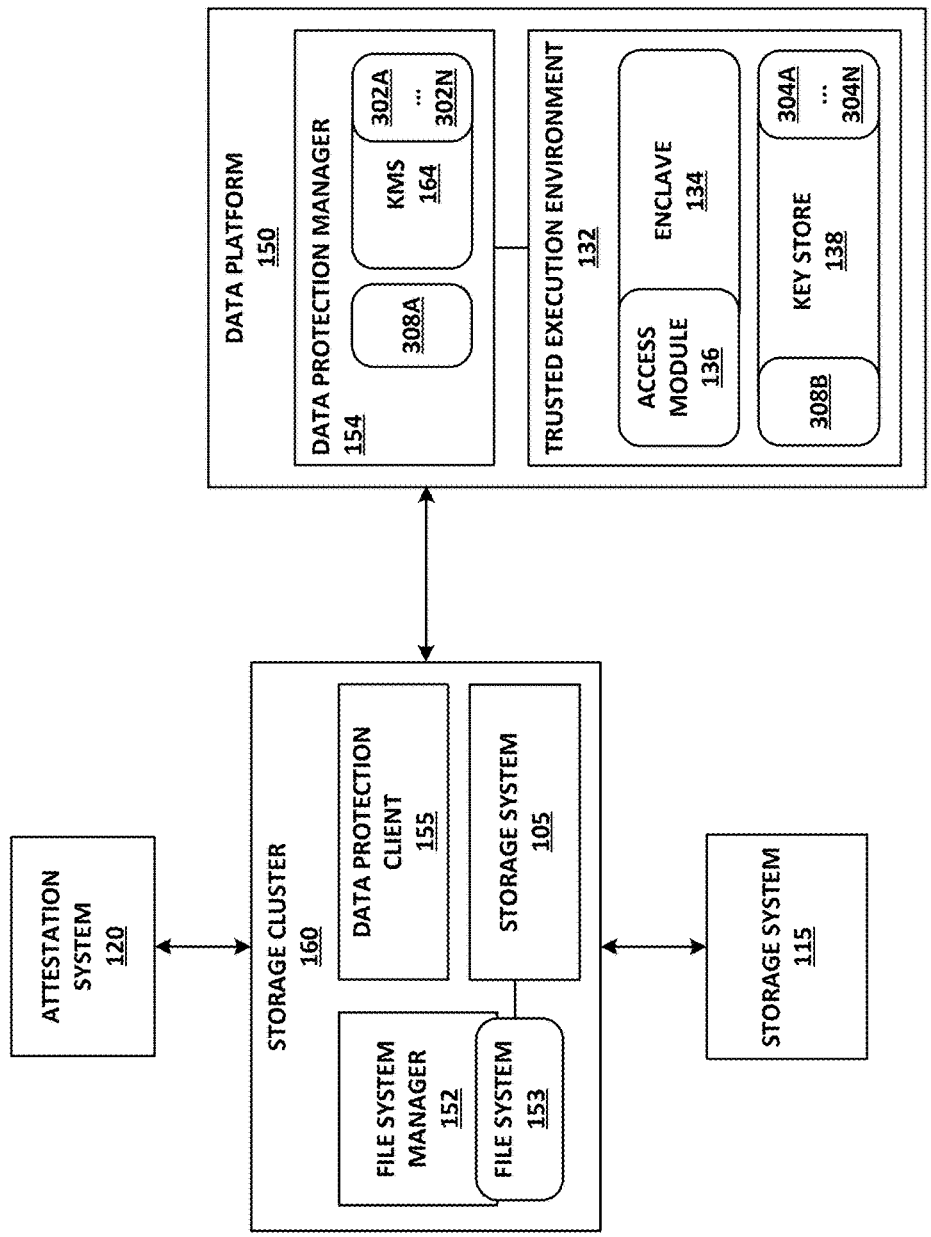
FIGS. 3A-3C are block diagrams illustrating example systems performing protected data restoration using confidential computing, in accordance with the techniques of this disclosure.
Figure 3B:
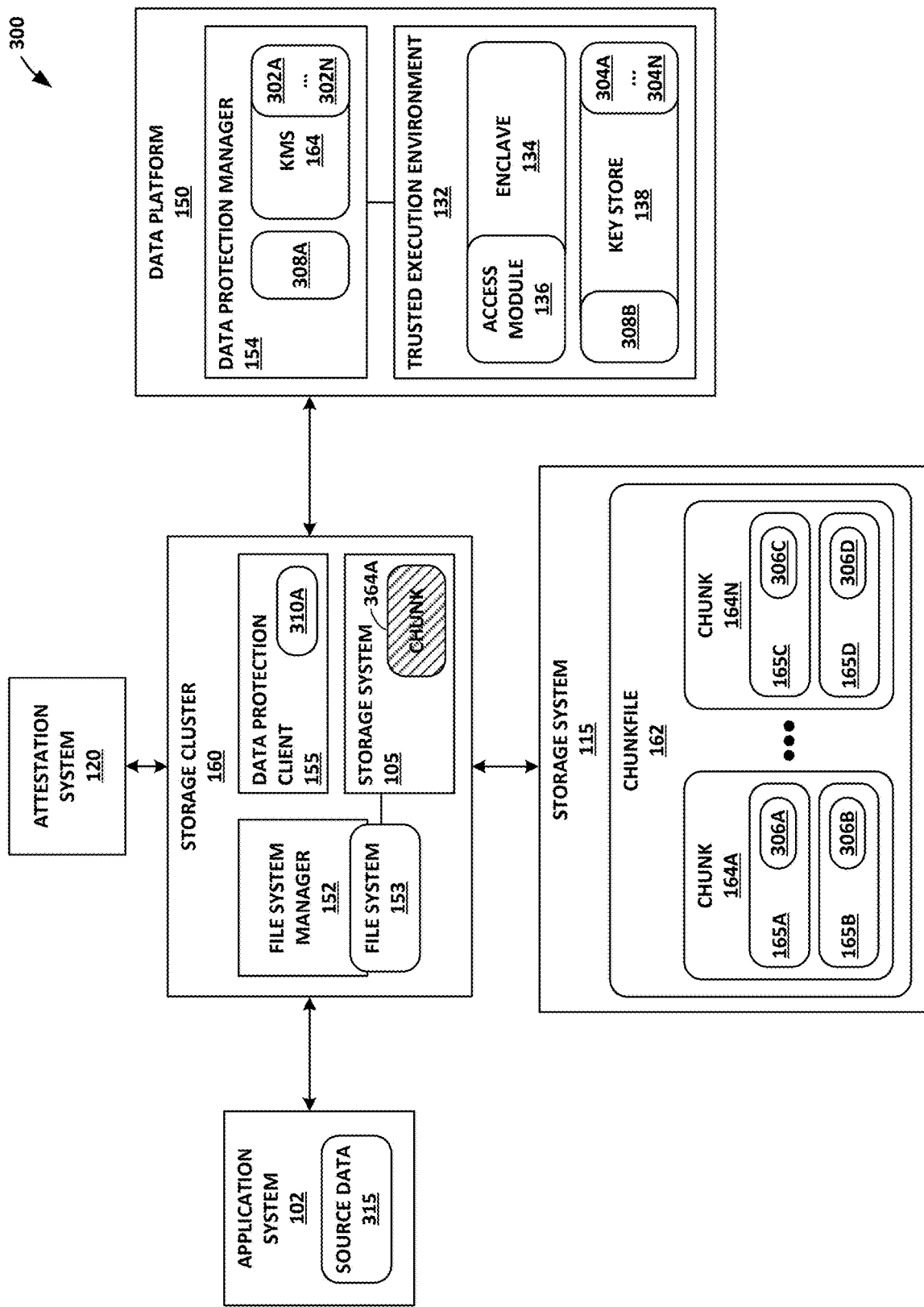
Figure 3C:
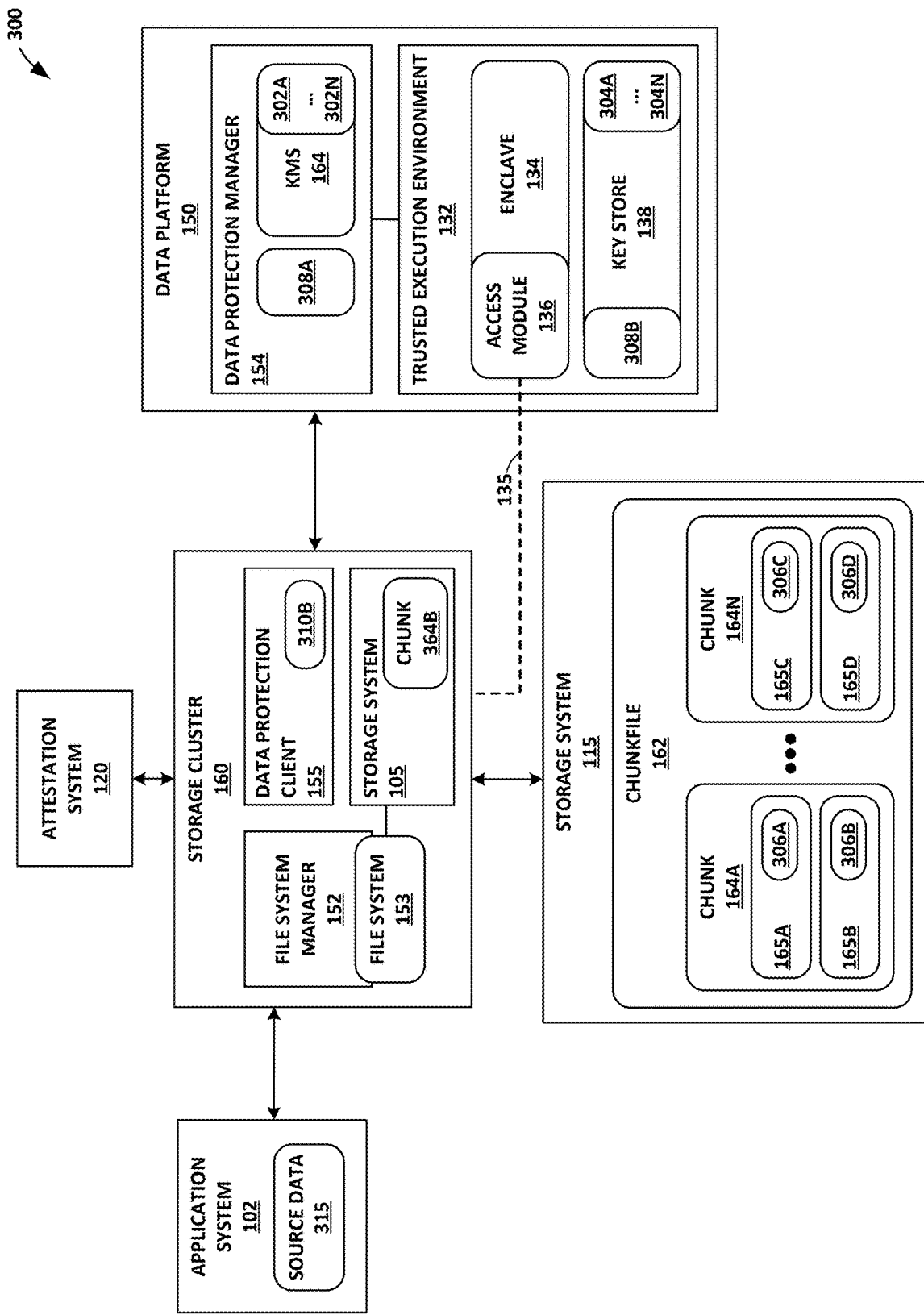

FIGS. 3A-3C are block diagrams illustrating example systems performing protected data restoration using confidential computing, in accordance with the techniques of this disclosure. System 300 of FIGS. 3A-3C may be described as an example or alternate implementation of system 100 of FIG. 1A or system 190 of FIG. 1B (where chunkfiles 162 are written to a local storage system 115). One or more aspects of FIGS. 3A-3C may be described herein within the context of FIG. 1A and FIG. 1B. For instance, data platform 150, storage cluster 160, attestation system 120, and storage system 115 of FIGS. 3A-3C may correspond to data platform 150, storage cluster 160, attestation system 120, and storage system 115 of FIG. 1A.

Initialization or setup of data platform 150 will now be described with respect to the example of FIG. 3A. During setup, data platform 150 may initialize or prepare storage system 115 to store encrypted chunks 164. For example, data platform 150 may create storage system 115 through a cloud storage provider or other public or private cloud service. Data platform 150 may obtain one or more addresses (e.g., URL(s)) from storage system 115 through which data can be read or written at storage system 115.

Data platform 150 may also create and store one or more key encryption keys 302, 304. For example, KMS 164 may generate one or more first key encryption keys 302 (e.g., KMS KEK(s)) and enclave 134 may generate one or more second key encryption keys 304 (e.g., enclave KEK(s)). In some examples, KMS may store first encryption key 302 and key store 138 may store second encryption key 304. As such, second encryption key 304 may be stored within trusted execution environment 132 and apart from first encryption key 302.

Data platform 150 may also establish authentication information 308 used to authenticate authorized users. As described above, data platform 150 may utilize MFA to authenticate users. In some examples, a TOTP may be used. In such case, authentication information may comprise a shared key (e.g., shared TOTP parameters) generated when a user sets up MFA. Enclave 134 may store the authentication information 308B for MFA in key store 138. In some examples, data platform 150 may also utilize other authentication information, such as a username and password. In some examples, data platform 150 may store authentication information 308 at different locations. For example, data protection manager 154 may store first authentication information 308A (e.g., username and password), such as at storage system 105, and store second authentication information 308B (e.g., shared keys or TOTP parameters), such as at key store 138. Enclave 134 may store and seal authentication information 308 in key store 138.

After initialization, data platform 150 may store data (e.g., encrypted chunks) to storage system 115, as will now be described with respect to the example of FIG. 3B. For example, data platform 150 may store one or more encrypted chunks 164 to backup source data 315 from a source system, such as application system 102. Application system 102, chunks 164, 364 and chunkfile 162 of FIGS. 3A-3C may be examples of application system 102, chunks 164, and chunkfile 162 of FIG. 1A.

Data platform 150 may generate one or more unencrypted chunks 364 from the source data 315, such as described above. For example, data platform 150 may generate unencrypted chunks 364 comprising 16-48 kB portions of source data 315. Storage cluster 160 may encrypt unencrypted chunk 364 using a data encryption key 310 generated from individual units of distinct key data 306 to generate encrypted chunk 164. For example, storage cluster 160 may generate data encryption key 310 by applying a key derivation function (e.g., HKDF) to first key data 306A and second key data 306B. Storage cluster 160 may store encrypted chunk 164 along with multiple units of encrypted key data 165. As shown in the example of FIG. 3B for instance, storage cluster 160 stores encrypted chunk 164A along with first encrypted key data 165A and second encrypted key data 165B.

Encrypted key data 165 encodes key data 306 therein. For example, storage cluster 160 may generate first encrypted key data 165A by encrypting first key data 306A and second encrypted key data 165B by encrypting second key data 306B. Storage cluster 160 may encrypt individual units of distinct key data 306 with different key encryption keys 302, 304 when generating individual units of encrypted key data 165. For example, storage cluster 160 may encrypt first key data 306A with a first key encryption key 302A (e.g., KMS KEK) and encrypt second key data 306B with second key encryption key 304A (e.g., enclave KEK).

In some examples, storage cluster 160 may generate a plurality of individual units of distinct key data 306 for each encrypted chunk 164. As shown in the example of FIG. 3B for instance, storage cluster 160 generates a first pair of distinct key data 306A, 306B for encrypted chunk 164A and a second pair of distinct key data 306C, 306D for encrypted chunk 164N. In this manner, unauthorized access to individual units of distinct key data 306 for a particular encrypted chunk 164 or a group of encrypted chunks 164 does not allow other encrypted chunks 164 to be decrypted.

As illustrated by the hash marks at chunk 364A, chunks 364 may be deleted or damaged and thus require restoration. Protected data restoration may be performed on one or more encrypted chunks 164, as will now be described with respect to FIG. 3C. Data platform 150 may require authentication via MFA prior to permitting a data to be restored from a backup. For example, data platform 150 may verify first authentication information 308A (e.g., username and password), second authentication information 308B (e.g., shared key or shared TOTP parameters), or both received from a user. Data platform 150 may verify authentication information by comparing first authentication information 308A and second authentication information 308B to authentication information provided by the user (e.g., username, password, TOTP).

After authentication, storage cluster 160 may retrieve encrypted chunk 164 and individual units of encrypted key data 165 stored along with encrypted chunk 164 from storage system 115. For example, relative to encrypted chunk 164A, storage cluster 160 may retrieve encrypted chunk 164A along with first encrypted key data 165A and second encrypted key data 165B from storage system 115.

Individual units of distinct key data 306 within encrypted key data 165 may be obtained to generate a data encryption key 301 capable of decrypting encrypted chunk 164. Storage cluster 160 may send individual units of encrypted key data 165 to enclave 134, such as via a secure session with access module 136, for decryption. Enclave 134 may decrypt individual units of encrypted key data 165 with various key encryption keys 302, 304. For example, enclave 134 may decrypt first encrypted key data 165A with first key encryption key 302 (e.g., KMS KEK) and decrypt second encrypted key data 165B with second key encryption key 304 (e.g., enclave KEK) to obtain first key data 306A and second key data 306B, respectively. Enclave 134 may obtain first key encryption key 302 from data protection manager 154 and obtain second key encryption key 304 from key store 138. After decryption, enclave 134 may send individual units of distinct key data 306 to storage cluster 160.

Storage cluster 160 may derive data encryption key 310 with individual units of distinct key data 306 decrypted by and received from enclave 134. For example, to generate or derive data encryption key 310B to decrypt encrypted chunk 164A, storage cluster 160 may execute a derivation process (e.g., HKDF) using first key data 306A and second key data 306B as input. As can be seen, data encryption key 310B may be identical to or otherwise correspond to data encryption key 310A, used to encrypt chunk 164A. Storage cluster 160 may then decrypt encrypted chunk 164 using data encryption key 310. Storage cluster 160 may use the decrypted data from encrypted chunk 164 to restore a backup. For example, storage cluster 160 may store the decrypted data from encrypted chunk 164, such as at storage system 105, to restore chunk 364B at storage system 105.

Figure 4:
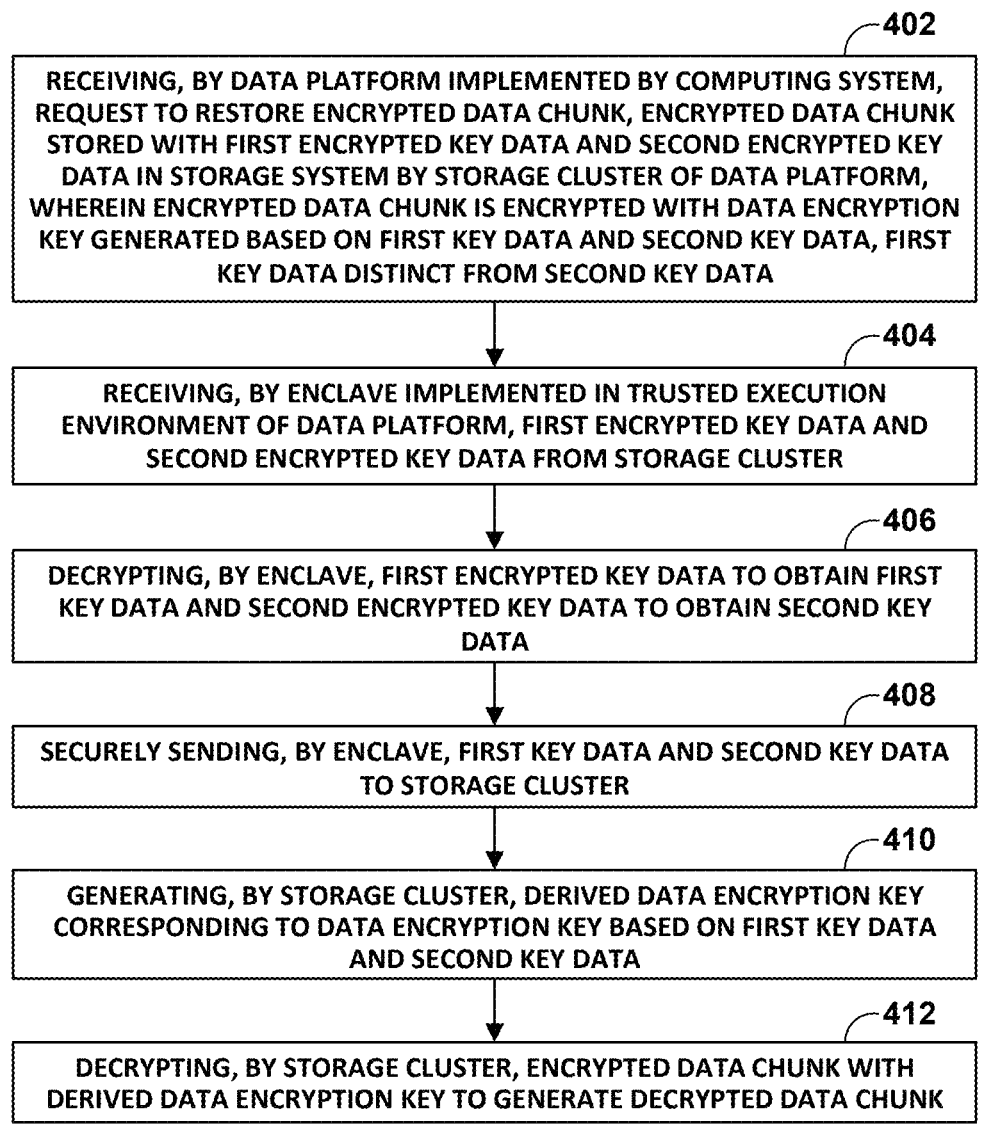
FIG. 4 is a flowchart illustrating an example mode of operation for a data platform to perform protected data restoration using confidential computing, in accordance with techniques of this disclosure.

FIG. 4 is a flowchart illustrating an example mode of operation for a data platform to perform protected data restoration using confidential computing, in accordance with techniques of this disclosure. FIG. 4 is described in the context of FIGS. 3A-3C. As shown in the example of FIG. 4, data platform 150 may receive a request to restore an encrypted chunk 164 (402). Encrypted chunk 164A may be stored with first encrypted key data 165A and second encrypted key data 165B in storage system 115 by a storage cluster 160 data platform 150. Encrypted chunk 164A may be encrypted with a data encryption key 310A generated based on first key data 306A and second key data 306B. First key data 306A may be distinct from second key data 306B. Responsive to receiving the request, storage cluster 160 may retrieve encrypted chunk 164A, first encrypted key data 306A, and second encrypted key data 306B from storage system 115. In some examples, storage cluster 160 may authenticate the request using MFA.

Data platform 150 may generate first encrypted key data 165A using a first key encryption key 302A and second encrypted key data 165B using a second key encryption key 304A. For example, KMS 164 may generate first key encryption key 302A and enclave 134 may generate second key encryption key 304A. Data platform 150 may store first key encryption key 302A in a local storage system 105. Enclave 134 may store second key encryption key 304A in trusted execution environment 132, such as in data store 138. Enclave 134 may seal second encryption key 304A in trusted execution environment 132. Enclave 134 may be implemented in trusted execution environment 132 of data platform 150.

In some examples, storage cluster 160 may generate individual units of distinct key data 306 to encrypt chunk 364. For instance, storage cluster 160 may generate first key data 306A and second key data 306B such that first key data 306A and second key data 306B each comprise distinct random numbers or data. Storage cluster 160 may generate first encrypted key data 165A based on first key data 306A and second encrypted key data 165B based on second key data 306B. For example, storage cluster 160 may encrypt first key data 306A with first key encryption key 302A to generate first encrypted key data 165A and encrypt second key data 306B with second key encryption key 304A to generate second encrypted key data 165B.

Storage cluster 160 may verify enclave 134 with an attestation service 120. For example, storage cluster 160 may transmit a public key of the enclave to attestation service 120 and, in response, receive an indication of the validity of enclave 134 from attestation service 120. Trusted execution environment 132 may comprise an isolated portion of processing circuitry of data platform 150, an isolated portion of memory of data platform 150, or both.

Enclave 134 may receive first encrypted key data 165A and second encrypted key data 165B from storage cluster 160 (404). Enclave 134 may decrypt first encrypted key data 165A to obtain first key data 306A and second encrypted key data 165B to obtain second key data 306B (406). In some examples, enclave 134 may obtain key encryption keys 302, 304 to decrypt encrypted key data 165. For instance, enclave 134 may retrieve first key encryption key 302A from data protection manager 154 and second key encryption key 304A from key store 138 and use first key encryption key 302A and second key encryption key 304A to decrypt first encrypted key data 165A and second encrypted key data 165B, respectively.

Once decrypted, enclave 134 may securely send first key data 306A and second key data 306B to storage cluster 160 (408), such as via secure session 135. Storage cluster 160 may generate a derived data encryption key 310B corresponding to the data encryption key 310A based on first key data 306A and second key data 306B (410). For example, storage cluster 160 may execute a key derivation function (e.g., HKDF) using first key data 306A and second key data 306B as input to derive data encryption key 310B. Storage cluster 160 may decrypt encrypted chunk 164A with derived data encryption key 310B to generate a decrypted chunk 364B (412). Storage cluster 160 may store the decrypted chunk 364, such as at storage system 105 thereby restoring encrypted chunk 164.

Although the techniques described in this disclosure are primarily described with respect to a backup function performed by a data protection manager of a data platform, similar techniques may additionally or alternatively be applied for an archive, replica, clone, or snapshot function performed by the data platform. In such cases, backups 142 would be archives, replicas, clones, or snapshots, respectively.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth herein, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

The invention claimed is:

1. A method comprising:
   receiving, by a data platform implemented by a computing system, a request to restore an encrypted chunk of data, the encrypted chunk stored with first encrypted key data and second encrypted key data in a storage system by a storage cluster of the data platform, wherein the encrypted chunk is encrypted with a data encryption key generated based on first key data and second key data, the first key data distinct from the second key data;
   receiving, by an enclave implemented in a trusted execution environment of the data platform, the first encrypted key data and the second encrypted key data from the storage cluster;
   decrypting, by the enclave, the first encrypted key data to obtain the first key data and the second encrypted key data to obtain the second key data;
   securely sending, by the enclave, the first key data and the second key data to the storage cluster;
   generating, by the storage cluster and based on the first key data and the second key data, a derived data encryption key corresponding to the data encryption key; and
   decrypting, by the storage cluster, the encrypted chunk with the derived data encryption key to generate a decrypted chunk.

2. The method of claim 1, further comprising, restoring, by the storage cluster, the encrypted chunk by storing the decrypted chunk.

3. The method of claim 1, further comprising:
   transmitting, by the storage cluster, a public key of the enclave to an attestation service; and
   receiving, by the storage cluster, an indication of validity of the enclave from the attestation service; and
   refraining from decrypting the first encrypted key to obtain the first key data and the second encrypted key data to obtain the second key data when the indication of validity indicates the enclave is invalid.

4. The method of claim 1, further comprising authenticating, by the storage cluster, the request using multi-factor authentication, wherein receiving the request to restore an encrypted chunk of data occurs subsequent authentication of the request.

5. The method of claim 1, further comprising, responsive to receiving the request, retrieving, by the storage cluster, the encrypted chunk, the first encrypted key data and the second encrypted key data from the storage system.

6. The method of claim 1, further comprising, generating, based on the first key data, the first encrypted key data and generating, based on the second key data, the second encrypted key data.

7. The method of claim 1, further comprising generating the first key data and the second key data, wherein the first key data and the second key data each comprise a distinct random number.

8. The method of claim 1, further comprising:
generating, by the data platform, a first key encryption key;
generating, by the enclave, a second key encryption key; and
generating, by the data platform, the first encrypted key data using the first key encryption key and the second encrypted key data using the second key encryption key.

9. The method of claim 8, further comprising:
storing, by the data platform, the first key encryption key in a local storage system; and
storing, by the enclave, the second key encryption key in the trusted execution environment.

10. The method of claim 1, further comprising sealing, by the enclave, the second encryption key in the trusted execution environment.

11. The method of claim 1, wherein the trusted execution environment comprises an isolated portion of processing circuitry of the data platform.

12. The method of claim 1, wherein the trusted execution environment comprises an isolated portion of memory of the data platform.

13. A computing system comprising:
a memory storing instructions; and
processing circuitry that executes the instructions to:
receive a request to restore an encrypted chunk of data, the encrypted chunk stored with first encrypted key data and second encrypted key data in a storage system by a storage cluster of a data platform, wherein the encrypted chunk is encrypted with a data encryption key generated based on first key data and second key data, the first key data distinct from the second key data;
receive, by an enclave implemented in a trusted execution environment of the processing circuitry, the first encrypted key data and the second encrypted key data from the storage cluster;
decrypt, by the enclave, the first encrypted key data to obtain the first key data and the second encrypted key data to obtain the second key data;
securely send, by the enclave, the first key data and the second key data to the storage cluster;
generate, based on the first key data and the second key data, a derived data encryption key corresponding to the data encryption key; and
decrypt the encrypted chunk with the derived data encryption key to generate a decrypted chunk.

14. The computing system of claim 13, wherein the processing circuitry further executes the instructions to restore the encrypted chunk by storing the decrypted chunk.

15. The computing system of claim 13, wherein the processing circuitry further executes the instructions to, responsive to receiving the request, retrieve the encrypted chunk, the first encrypted key data and the second encrypted key data from the storage system.

16. The computing system of claim 13, wherein the processing circuitry further executes the instructions to generate, based on the first key data, the first encrypted key data and generate, based on the second key data, the second encrypted key data.

17. The computing system of claim 13, wherein the processing circuitry further executes the instructions to generate the first key data and the second key data, wherein the first key data and the second key data each comprise a distinct random number.

18. The computing system of claim 13, wherein the processing circuitry further executes the instructions to:
generate a first key encryption key;
generate, by the enclave, a second key encryption key; and
generate the first encrypted key data using the first key encryption key and the second encrypted key data using the second key encryption key.

19. The computing system of claim 18, wherein the processing circuitry further executes the instructions to:
storing, by the data platform, the first key encryption key in a local storage system; and
storing, by the enclave, the second key encryption key in the trusted execution environment.

20. A computer-readable storage medium comprising instructions that, when executed, cause processing circuitry of a computing system to:
receive a request to restore an encrypted chunk of data, the encrypted chunk stored with first encrypted key data and second encrypted key data in a storage system by a storage cluster of a data platform, wherein the encrypted chunk is encrypted with a data encryption key generated based on first key data and second key data, the first key data distinct from the second key data;
receive, by an enclave implemented in a trusted execution environment of the processing circuitry, the first encrypted key data and the second encrypted key data from the storage cluster;
decrypt, by the enclave, the first encrypted key data to obtain the first key data and the second encrypted key data to obtain the second key data;
securely send, by the enclave, the first key data and the second key data to the storage cluster;
generate, based on the first key data and the second key data, a derived data encryption key corresponding to the data encryption key; and
decrypt the encrypted chunk with the derived data encryption key to generate a decrypted chunk.

* * * * *